Jan. 28, 1964     T. K. PETERSEN ETAL     3,119,598
AIR FILM SUPPORTED WEIGHING JACK

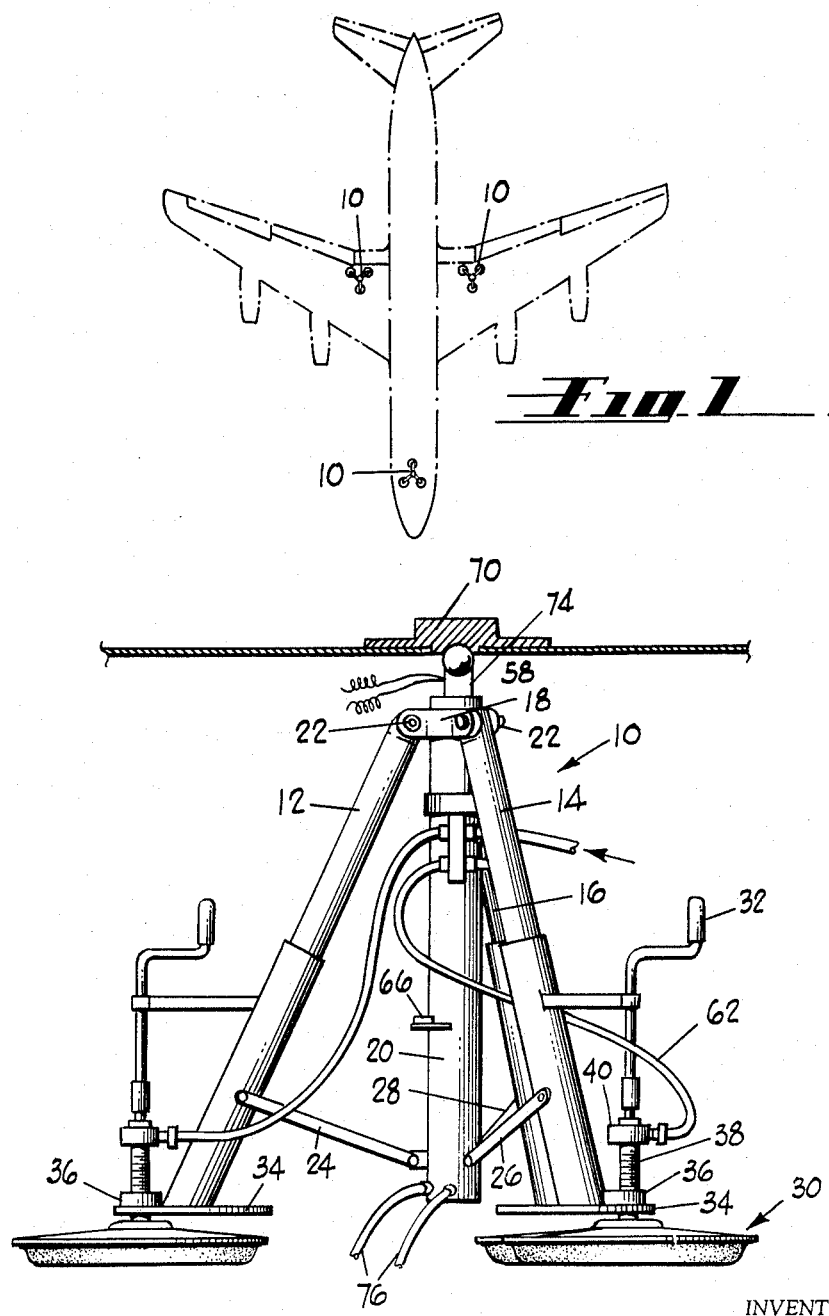

Original Filed Sept. 6, 1960     2 Sheets-Sheet 2

INVENTORS
THORVALD K. PETERSEN
GEORGE A. THOMPSON
BY
*Edwin Loates*
ATTORNEY

United States Patent Office 3,119,598
Patented Jan. 28, 1964

3,119,598
AIR FILM SUPPORTED WEIGHING JACK
Thorvald K. Petersen, Santa Monica, and George A. Thompson, Los Angeles, Calif., assignors to Douglas Aircraft Company, Inc., Santa Monica, Calif.
Continuation of application Ser. No. 53,974, Sept. 6, 1960. This application Aug. 28, 1962, Ser. No. 220,943
8 Claims. (Cl. 254—93)

This invention broadly relates to derricks, particularly multi-leg jacking derricks employed in conjunction with weighing cells and pads in the weighing of aircraft, but also concerns itself with jacking derricks used for other purposes than that of weighing aircraft. It is, in fact, relevant to all multi-leg derricks in which a load is to be jacked up or down by means of a truly vertical jacking thrust to enable accurate response of a weighing cell interposed between the jack-end and a pad on the vehicle.

This application is a continuation of our corresponding application, Serial No. 53,974, filed September 6, 1960, entitled Air Film Supported Weighing Jack, now abandoned.

One of the onerous tasks in weighing airplanes, for example, by means of multi-leg jacking derricks, working with a weighing cell and a pad on the underside of the craft, emanates from the fact that, for reasons hereinafter detailed, any minor change in the attitude of the airplane effectuates significant changes in the proper horizontal distance between the major (three in aircraft) contact areas of the three jacks and cells with the pads on the aircraft. Usually, also, because of the quite high friction between the jacks' feet and the floor, the jack cannot move on the floor in all directions necessary to enable it to adjust itself so as to maintain the jack vertical under the pads. Friction with the ground plane thus causes one or more derricks to fail to reposition itself perfectly under the jack pads, thus altering these horizontal distances and the verticality of the jack and subjecting the derrick to an unbalanced side load or loads, because, without the present invention the derrick cannot reposition itself over such irregularities to maintain these distances constant or maintain the axis of the jack cylinder truly vertically beneath the airplane. This imbalance either renders the cell-reading inaccurate or destabilizes the craft being weighed, or both.

It is quite difficult, when not impossible, to manually adjust the "uncentered" leg or legs over, or onto, the irregularities in the floor and the present invention provides a weighing derrick so constructed that the lower ends of the legs may reposition themselves to re-establish the true horizontal dimensions between the jacking points on the vehicle, the legs having feet or leg-ends also so constructed that they cannot be thrown out of mutual coplanarity upon encountering rugosities, etc. in the floor. Each leg is provided with novel means that float each leg-end and floatingly adjust the leg-end to, or over, or onto, irregularities, thus automatically "levelling" the derrick's footings, placing all leg-ends in co-planarity, and eliminating unbalanced side loads on the legs, as well as allowing omni-directional movement of each derrick on a film of pressure-air so as to reposition itself with respect to the other derricks, as aforesaid. Accordingly, the contact of the jack-cylinder with the weighing cell is always maintained absolutely vertical, thus eliminating weighing errors introduced by side loads on the leg-ends and obviating off-center thrusts applied to the cell by the hydraulic jack of the derrick. The horizontal distances between jacks also automatically adjust themselves to shifting attitudes of the vehicle.

Broadly considered, these and other objectives are attained by providing the combination with a central jack-element supported by a tripod, of tripod footing-means, or novel leg-ends, constructed and arranged to aerostatically buoy up the derrick, with respect to the derrick's supporting surface, such as a floor, so that the leg ends and the derrick floats over or onto, or with respect to, the floor, thereby to enable the derrick to move in any horizontal direction necessary to reposition itself if the airplane's attitude should change, thus to maintain the aforesaid horizontal distances at their desired magnitudes, while adjusting, automatically, each footing to, on or over floor-irregularities, thus adjusting all legs into, in effect, co-planarity, or at least into attitudes that set up no unbalanced side loads that would cant or tilt the longitudinal center-line of the derrick out of the vertical attitude.

By way of example only, the application of these and other concepts to an airplane "weighing jack" combined with a weighing cell, and a pad on the airplane, is representationally depicted in the accompanying drawings and is described hereinafter in conjunction with said drawings. It is to be well understood, however, that this exemplificatory embodiment does not constitute the sole physical form that lies within the scope of the invention, the true nature and ambit of the invention being set forth in the annexed claims defining same.

In these drawings:

FIG. 1 is a phantom top plan view of an airplane in process of being weighed and employing three of the present weighing jacks;

FIG. 2 is a side elevational view of a hydraulic lifting jack, used in conjunction with a weighing cell and lift-receiving pad, in weighing airplanes;

Figure 3:
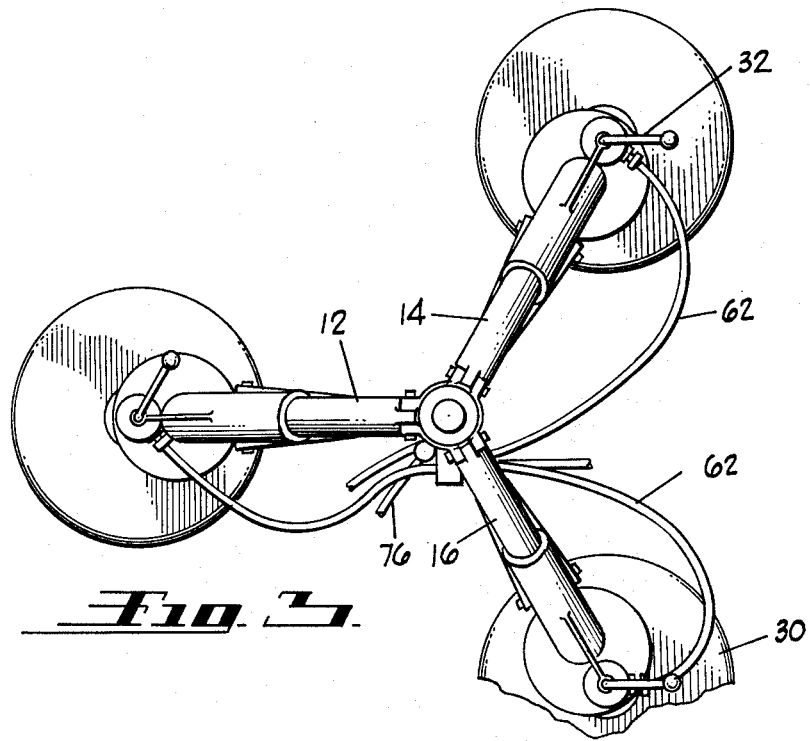
FIG. 3 is a top plan view of this derrick, or jack.
Figure 4:
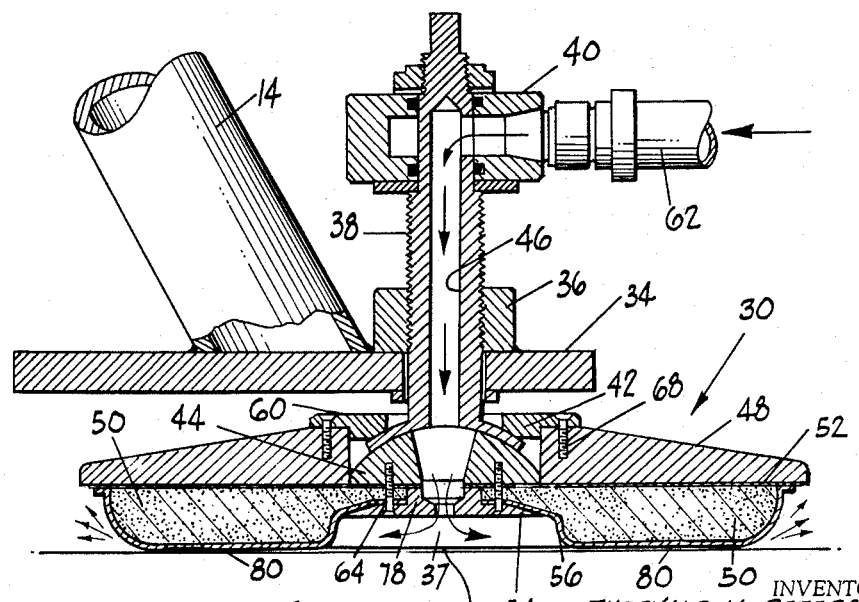
FIG. 4 is an enlarged, detailed view of the foot, or lower terminus, arrangement and construction that each of the legs of the derrick bears.

In FIG. 1, an airplane is shown as lifted, with its landing gear out of contact with the ground, by means of three jacking-type tripod weighing derrick units, 10. One unit 10 is located under each of the landing gear bogies (not shown) in each wing-half and one unit 10 is located under the forward portion of the fuselage.

As shown in FIG. 2, the derrick or lifting jack 10 takes the form of a tripod having three legs, 12, 14, 16 of equal length and each preferably consisting of hollow metallic tubing. Legs 12, 14, 16 may, if desired, be individually pivotally joined, at their upper ends, to a ring or spider 18, by means of articulations or pivots 22, in order that the tripod may be collapsed "laterally," as well as vertically by means of the jack cylinder, for compact storage, if desired.

The spider 18, if utilized, is rigidly fixed to the main cylinder 20 of a centrally disposed hydraulic jack, the piston 58 of which is shown retracted, it being protracted, with a weighing cell 74 engageable in a pad 70 on the underside of the airplane's fuselage or other main component.

At the lower run of the legs there may be provided, if desired, a stabilizing linkage consisting of links 24, 26, 28. If employed, they are pivotally connected at their outer ends to the respective legs and are similarly connected, at their inner ends, to the main cylinder 18A.

Each leg 12, 14, 16 is provided with a foot, or bearing, or supporting "web-foot" or air-buoy, 30. Each foot 30 is connected, in a novel manner later described, to the lower terminus of the adjacent leg, to a height-adjusting device, 32, etc., and to an inlet 46 for pressurized air.

More specifically referring to the mounting arrangement for each foot 30, it consists of a horizontal, circular flange or plate 34 welded to the lowermost end of the legs, 12, 14, 16; a centrally threaded boss 36 welded to the upper face of the flange, an elongate, hollow shaft 38 fixed at its lower end to the foot in a novel manner later particularized, and bearing an air inlet means 46 and 40 at its upper end; an intermediate portion of this shaft being threaded as shown on its periphery for working up and down in the complementarily threaded boss 36. The uppermost end of shaft 38 is shaped for engagement with a hand-crank 32 for actuating the rod.

Thus, initial adjustments of each foot with respect to the floor contour may be made by hand, while adjustments of the protraction and retraction of the piston 58 effectuate both coarse and fine adjustments in levelling the airplane during weighing thereof, conventional control of the hydraulic means 76, etc. being provided but not shown.

The shaft 38 terminates at its lower end in a downwardly concave, spheric flange 42 surrounding the lower mouth of the air-passage in 38, etc. The foot 30 itself is enabled to pivot in all the planes of space by means therein cooperating with 30 and acting as a fulcrum for such movements, the virtual center of this fulcrum, or ball-and-socket joint, to that end lying congruent or coincident with the lowermost surface of the web-foot or pad. This congruency obviates all overturning moments which would tilt the trailing or leading edge of the foot downwardly to cause detrimental drag and, worse, would allow "blast-out" of the buoying air at an edge of the foot.

The foot 30 is constructed as a laminated disc having a rigid back-up, or base plate 48 having its central portion hollow and closed off at the top by means of a centrally apertured plate 60 united to 48 by stud bolts, or the like, 68, as shown. Aligned with and below plate 60 is an annular, centrally perforate flange 78. On flange 78 an upwardly convex, centrally perforate spheric bearing plate 44 is fixed in such manner as to cooperate with spheric flange 42, there being sufficient peripheral clearance between 42 and the central hollow in 48 to permit a rather wide range of self-adjustment of foot 30 around this articulation in all directions in space, thereby to enable further automatic "coarse" adjustments of the foot to a rough floor or the ground. These adjustments are facilitated by the geometry of this fulcrum means which locates the virtual pivot point 86 at the center of the lower surface of the foot.

As previously mentioned, the footing or disc-like unit 30 is laminated, the lower face of the rigid disc 48 being bonded as shown at 52 to a lamina of resiliently-yieldable material 50 which is of novel construction, arrangement, shape and functioning.

Preferably, disc 50 consists of a multicellular, closed cell, elastomer, such as a synthetic or natural rubber, the disc being quite concave near its center. However, it may well consist of a resilient plastic, such as a foamed polyurethane of the type that is bondable to discs 48 made of such metals as iron, aluminum and the like. The exposed face of the lamina is covered with a thin but tough skin of synthetic or natural rubber or plastic, 80, which may well also be reinforced with a nylon textile fabric to prevent damage to the layer 80 itself.

This lamina 50 is provided primarily for the purpose of yieldably fitting to very minute or microscopic or so-called "mirror" floor-irregularities; it is an auxiliary to the principal levelling agent—pressurized air interposed as a layer between 50 and the floor. Another one of its functions is to serve as a barrier to prevent the air from leaking away too rapidly around the periphery of the foot. The main vertical and side loads of the derrick or jack, however, are taken by this very thin layer of pressurized air slowly escaping around the foot's periphery and underlying each foot, so that the derrick and all its legs float on a flowing layer of pressurized air. The layer is preferably .015 to .030 inch thick but the invention is quite operable with both thinner and thicker layers.

It follows that on encountering irregularities in the floor of average height or depth, the foot merely floats on, over or past, same thereby obviating the unbalanced side loads heretofore applied to one or more legs by their feet riding onto minute protuberances or dropping partially into minute depressions, or encountering floors that are localizedly smooth but, overall, contain undulations over a given extent. Thus, the feet are capable of omnidirectional movement in a horizontal plane, for the purpose hereinbefore stated and also of self-adjustment into co-planarity. The chief relationship or arrangement of parts responsible for effectuating this action is the large ratio of the area of the footing means to the weighed-load engaging means at a "point," locus or relatively small finite area on the weighed article. By virtue of this ratio, when a leg moves or is moved laterally from its proper, generally vertical, attitude under the load being weighed, a restoring moment is set up, by virtue of the larger area (and hence the greater air pressure on the "low" side of the footing) which brings the lowermost surface of the footing back into parallelism with the supporting surface. It naturally follows that the concerned leg is also restored to its proper position as a desired consequence of such action.

Rugosities are also compensated for by the action of the ball-and-socket combination 42, 44, etc., any not thus being compensated for being taken care of by the derrick-floating layer of pressurized air flowing radially outwardly under the foot. The ball-and-socket sub-combination also permits the edge of the foot to roll or rotate around its vertical axis on an obstacle should said encounter an insurmountable, laterally located obstacle, such as occurs when the foot is slid up a channel or guide having narrow side walls.

Lamina 50 is fixedly clamped, at its central portion, to the lower face of rigid disc 44 by means of a disc-like portion 54 of flange 78 having a hollow neck, as shown, for coaxially registering with the air passage through the hollow articulation aforedescribed. Portion 54 is fixed through the lamina 50 to member 44 by means of stud or carriage bolts, or the like, 64, as shown. The lamina 50 can, if desired, be bonded directly to disc 48.

A plenum chamber 56 is formed at the bottom center of foot 30 by virtue of the shape of the lower face of lamina 50, and air flowing out from throat 37 and lamina 50 and the floor provides a substantially frictionless supporting layer for the derrick. This orifice 37 is proportioned in diameter to pass only a predetermined maximum amount or volume of air at a given maximum pressure, say of the order of or not exceeding 40 lb./sq. in.

Individual adjustment of each leg by means of the cranks 32 can also be utilized to bring the central strut 20 into verticality.

Each leg 14 may be provided with more than one of the flotation-footings 30, provided that they be mounted to the lower end of 14 in such a manner that a concentrated, or centered, reaction is thereby applied to each leg-end.

As shown in FIG. 2, a target-type level 66 is provided on the member 20 to indicate verticality of the derrick. Air hoses 62 lead pressurized air from a source thereof, not shown, to the plenum chambers.

Although certain descriptive and specific terminology, certain parameters, geometrical shapes, and other specificities have been employed hereinabove, such utilization has been made thereof for the purpose of concreteness merely. It is to be understood that these specificities constitute no sort of limitation upon the scope of the invention unless required by the terms and ambit of the subjoined claims.

We claim:
1. A jack for elevating a vehicle in the weighing thereof by the application of a vertical lifting force to a jacking point on the vehicle: comprising:
   elevatable and lowerable jacking means engageable with a jacking point on the vehicle;
   footing means affixed to the jacking means for supporting the jacking means on a supporting surface, said footing means including a planar resilient pad for face to face contact with the surface and being a surface area greater than an area of contact of said jacking point with said vehicle; and air outlet means in communication with a source of pressurized air and with the underside of the resilient pad and effecting a continuous flow of air across substantially the full undersurface of the resilient pad, whereby side loads applied to the jack result in self-compensating movement of the jack on its substantially friction free air floated resilient pad.

2. A jack as defined in claim 1 wherein a plenum chamber is centrally located in the underside of the resilient pad and said chamber receives air from said outlet and then distributes it to the undersurface of the resilient pad.

3. A jack as defined in claim 1 wherein the footing means includes a rigid back-up plate and the resilient pad has at least one plenum chamber and is united to the underside of the back-up plate, said air outlet means including a passage through the back-up plate communicating with the plenum chamber.

4. A multi-leg derrick, comprising:
protractable and retractable jack means having a normally vertical centerline;
a plurality of legs extending laterally from the centerline of the jack means, each of said legs having footing means to support said jack means on a supporting surface, the footing means including a planar resilient pad; and
means effecting a continuous flow of air between the pad and supporting surface for substantially complete elimination of sliding friction therebetween.

5. A multi-leg derrick comprising:
protractable and retractable jack means having a normally vertical centerline;
at least three non-coplanar legs extending laterally from the centerline of the jack means, each of said legs having footing means each including a planar resilient pad; and
means effecting a continuous flow of air between the pad and a supporting surface for substantially complete elimination of sliding friction therebetween, there being means adjusting the centerline of the jack means relative to the legs whereby the centerline can be trued to a substantially vertical position to accommodate variation in the planarity of the supporting surface.

6. A jack as defined in claim 5 wherein the means for adjusting the centerline of the jack means includes means on at least two elements of said footing means for their adjustment vertically with respect to their respective legs; and
a universal joint between the legs and their respective footing means whereby the resilient pads remain in face to face contact with the supporting surface.

7. A jack as defined in claim 5 wherein there are means for vertical adjustment of the footing means, said means including a jack screw terminated on its bottom end by a downwardly opening concave spherical segment; and
a convex spherical segment seated in the concave segment and attached to the resilient pad.

8. A jack for elevating a load by the application of a substantially vertical lifting force to a jacking point on the load, comprising:
elevatable and lowerable jacking means engageable with a lifting force receiving region of the load;
footing means affixed to the jacking means for supporting the jacking means on a supporting surface, said footing means including a planar resilient pad adapted to contact the surface in face to face relation;
a source of pressurized air; and
air outlet means in communication with said source, said air outlet means being disposed in the footing means and discharging air in a continuous flow across an undersurface of the pad aerodynamically to support the pad in substantially friction free contact with the supporting surface, whereby lateral loads applied to the jack result in lateral motion of the pad with respect to the supporting surface.

References Cited in the file of this patent

UNITED STATES PATENTS

| | | |
|---|---|---|
| 2,240,724 | Stoehr | May 6, 1941 |
| 2,327,180 | Diercksmeier et al. | Aug. 17, 1943 |
| 2,335,692 | Murray | Nov. 30, 1943 |
| 2,341,542 | Grime | Feb. 15, 1944 |
| 2,395,411 | Kittel | Feb. 26, 1946 |
| 2,477,854 | Baker | Aug. 2, 1949 |
| 2,511,979 | Goddard | June 20, 1950 |
| 2,695,759 | Crosslin | Nov. 30, 1954 |
| 2,699,310 | Evans | Jan. 11, 1955 |
| 2,819,873 | Pearne | Jan. 14, 1958 |
| 2,823,958 | Terry | Feb. 18, 1958 |
| 2,868,593 | Jones | Jan. 13, 1959 |
| 2,899,243 | Acterman | Aug. 11, 1959 |
| 2,905,768 | Cronquist | Sept. 22, 1959 |
| 2,915,902 | Brugger | Dec. 8, 1959 |
| 2,918,183 | Petersen et al. | Dec. 22, 1959 |
| 2,928,709 | Baumeister | Mar. 15, 1960 |
| 2,938,590 | Barnett | May 31, 1960 |
| 2,976,736 | Cook | Mar. 28, 1961 |

OTHER REFERENCES

Sliding on Air, by Alex L. Haynes and David J. Day, Paper, No. 133, at the SAE annual meeting at Detroit, Jan. 11-15, 1960.